Patented June 30, 1942

2,288,047

UNITED STATES PATENT OFFICE 2,288,047

CERAMIC BODY AND A METHOD OF MAKING THE SAME

John D. Sullivan and Chester R. Austin, Columbus, Ohio, assignors to Battelle Memorial Institute, Columbus, Ohio, a corporation of Ohio No Drawing. Application December 24, 1938, Serial No. 247,682

6 Claims. (Cl. 106—71)

This invention relates to ceramic bodies and a method of making the same. More specifically, it relates to ceramic bodies, such as pottery and whitewares, containing plastics or resins incorporated therein.

In the prior art, pottery and whiteware articles usually have been made from bodies consisting of ball clay, kaolin, flint and feldspar. The ingredients are proportioned in the proper ratios, and the bodies are formed usually by the processes known as slip-casting, jiggering, pressing and hand-molding or throwing. In the slip-casting process the ingredients are mixed and if necessary ground with water to give a thin slip of pouring consistency. The slip is poured into a porous plaster mold and absorption of water by the mold effects building up of the body. The time allowed for water absorption by the mold governs the thickness of wall built up. After the required thickness of wall is effected, the excess slip is poured off, and the cast body allowed to dry further after which it is removed from the plaster mold. It is then dried and burned to an elevated temperature usually in the range of 2200° to 2400° F., depending on the body composition. The body may then be subjected to further treatments such as burning, for example, to 1800° F. to apply a glaze. Decorative coatings subsequently may be applied and burned on at appropriate temperatures, which in general are considerably lower than those used for maturing the glaze.

For jiggering the bodies have a lower water content than for slip-casting. Soft blanks are formed, an extrusion machine frequently being used for this purpose. The blank is placed on or in a plaster of Paris revolving mold and a template is employed to shape the contour of the side of the ware opposite the mold surface. Bodies of similar character are likewise formed by extrusion processes. Plastic or soft pressed bodies have about the same consistency as jiggering bodies and the body is forced by suitable means into a plaster mold of the desired configuration. Water is absorbed from the body and when the proper amount has been removed the body is taken from the mold and dried. Bodies are also formed by hand usually with the aid of a revolving wheel. All such bodies are burned in a manner similar to that described for slip-cast bodies.

One of the chief disadvantages in the manufacture of prior art ware is the cost of burning. Not only are high temperatures involved, but the ware requires special kiln settings, and the weight of the ware being burned may be only a relatively small percentage of the total load heated. Setting wares in kilns requires skilled labor and is an expensive operation. Not only is the burning operation expensive but the breakage and losses of ware are high.

We are aware that resins have been used in the past to make so-called plastic objects. We are further aware that ceramic materials have been used as fillers for plastics. In the prior art, however, the objects have been formed by subjecting the bodies to temperature and pressure under specificed conditions to make the resins plastic. In the case of thermosetting resins the conditions are chosen to cause the resin eventually to set. In all these cases, however, the plastic ingredient is the resin. Ceramic materials are fillers only.

One object of our invention is to produce unburned ceramic ware which will be of high strength and which will be highly resistant to slaking.

Another object is to prepare a body containing a large percentage of plastic clay and to so treat the body that it will be resistant to moisture attack without requiring a burning operation.

An additional object of our invention is to produce ceramic ware of an unusual and distinctive surface texture and appearance.

Another object is to provide a simple, efficient, practicable and inexpensive method for producing ceramic bodies of the type indicated.

Other objects will appear in the following description and the claims appended thereto.

In one of its phases, our invention consists of the production of a body which is primarily of ceramic material but which has incorporated therein a resin or plastic. The resin or plastic may be either of the thermosetting or thermoplastic type and it may be either natural or synthetic. In this specification, the term "resin" is used to designate such material.

In the preferred form of our process we use a plastic clay, for example, a ball clay to give plasticity, but any plastic clay, including bentonites, can be used. The procedure so far is the same as that followed in the prior ceramic art, but prior art bodies must be burned to give the proper physical properties. A serious drawback of unburned prior art bodies is poor strength but the chief disadvantage is that when they come in contact with water the clay slakes and the body disintegrates. Our invention involves adding a resin to the body which on heating protects the clay ingredients and adds strength. In addition, the clay of the body does not slake when it is brought into contact with water and so the body does not disintegrate.

The body including the resin is prepared and dried and then heated to a temperature high enough to mature the resin. In the case of thermosetting resins, an actual set may be effected. The temperature used will depend on the maturing temperature of the resin. The body is then ready for use and does not require a burning operation as in the case of prior art ware. The body may be prepared by slip-casting, hand-molding, jiggering, plastic pressing or the like. After heating or baking to mature the resin, the surface may be buffed or otherwise treated to enhance its beauty. It is also possible to buff the surface before baking. Also a lacquer coating which matures at a temperature corresponding to that at which the ware is baked may be applied to the raw or green body before baking to mature the resin.

The process is applicable to a large number of ceramic bodies, and this invention is not limited to any particular class of ware. For example, a common type whiteware body comprises the following:

| Ingredient | Per cent |
|---|---|
| Ball clay | 10 |
| Kaolin | 40 |
| Flint | 35 |
| Feldspar | 15 |

In bodies of this type the feldspar is the flux ingredient. In the practice of our invention since the body is not burned the expensive feldspar is not necessary, so is omitted. The body may be modified, for example, as follows:

| Ingredient | Per cent |
|---|---|
| Ball clay | 10 |
| Kaolin | 40 |
| Flint | 40 |
| Resin | 10 |

It will be understood, however, that the above is given merely as a general example and the invention is not limited to bodies of this composition or even to this type.

A specific example will be given to illustrate the invention. The example refers to a slip-casting body, although as previously stated the invention is not limited thereto. A batch consisting of 10 per cent of ball clay, 40 per cent of kaolin, 40 per cent of flint and 10 per cent of a phenol formaldehyde resin maturing at 300° F. in powdered form is mixed with water to the extent of 35 per cent of the weight of the dry ingredients and the batch blunged. In some instances it will be necessary to add a dispersing agent, for example, sodium silicate. The amount necessary will depend on the specific nature of the raw ceramic materials and the resin used. Amounts of 0.10 to 0.25 per cent have been used with various bodies. Sodium carbonate, phosphates and the like may also be used as electrolytes. The slip also may be prepared by other means well known to the art, for example, in a ball mill. The slip is then poured into a plaster of Paris mold to build the body in the same manner as that used to make regular whiteware bodies. After drying, the bodies are baked at a temperature suitable to mature the resin. The temperature found best suited for most of the resins used was 300° to 400° F., but as previously stated the temperature depends on the particular resin used. The time of heating depends on the thickness, shape, and mass of the body but usually varies from a few minutes to a few hours. For most objects the time range is from 30 minutes to 3 hours, but it depends on the resin used. Since the resin is matured by temperature and not temperature and pressure the time of application of heat is ordinarily longer than in the case of commercial plastics made at high pressures and using high percentages of resins.

Both thermoplastic and thermosetting resins have been used depending on the properties desired. It has been found that some thermoplastic resins imparted better water resisting properties than some thermosetting resins, and that a combination of a thermoplastic and a thermosetting resin was efficacious in making the body resistant to water. For example, a body was made using 10 per cent of a thermosetting resin, and, after maturing, a hollow article was partly immersed in water to determine the time required for moisture beads to appear on the inside by diffusion through the wall. In the case of one thermosetting resin moisture beads appeared in 72 hours, but when the 10 per cent of resin comprised 3 parts of the same thermosetting resin and 1 part of a thermoplastic resin no moisture beads appeared even at 384 hours. Bodies with no resin disintegrated in a few minutes after immersion.

Bodies have been made by jiggering using the same base body as that described above for slip-casting. The water content, however, was lowered to 28 per cent of the weight of the dry ingredients, and the addition of an electrolyte for dispersion was unnecessary.

Bodies of the same composition and consistency as those described for jiggering were also made by extrusion, plastic or soft-pressing, and by hand-molding. The workability of all these bodies was satisfactory.

The particular plastic to use depends on the proposed utilization of the product to be made. For example, thermoplastic resins of the cheaper price ranges are usually dark in color, and it may be desirable to use a more expensive thermoplastic or thermosetting resin if dark color is undesirable. It is preferable, however, to use resins that mature at relatively low temperatures, for example, from 200° F. to 450° F.

The amount of resin to use likewise depends on the properties desired. For most purposes it has been found that the proper range is from 5 to 20 per cent. There is no apparent disadvantage in exceeding 20 per cent but the cost is higher. We have made bodies containing as little as 1 per cent of resin but the resistance to slaking by water was decreased materially. For many purposes the range of 5 to 10 per cent is preferred.

The use of resins also permits modification of the ceramic contents of the body. A typical whiteware body containing 10 per cent of ball clay, 40 per cent of kaolin, 35 per cent of flint, and 15 per cent of feldspar was used in a foregoing illustration. In our invention a typical modified body of the same was given with a composition of 10 per cent of ball clay, 40 per cent each of kaolin and flint and 10 per cent of resin. This body may be further modified. We have, for example, eliminated completely the kaolin and made a body containing 75 per cent of flint, 15 per cent of ball clay and 10 per cent of resin. The chief requirements of the body in our process are the presence of a clay to confer plasticity and green strength to the body and a resin which on maturing confers baked or final strength and waterproofing characteristics without the necessity of burning the body.

We have used a variety of body compositions, and the following examples are merely typical ones to show the wide scope of the process. Employing 10 per cent of a thermoplastic or thermosetting resin we have made slip-casting bodies with the following clay, flint, and kaolin mixtures:

| Ball clay | Flint | Florida kaolin | North Carolina kaolin |
|---|---|---|---|
| Percent | Percent | Percent | Percent |
| 4.2 | 95.8 | 0.0 | 0.0 |
| 8.3 | 91.7 | 0.0 | 0.0 |
| 16.7 | 83.3 | 0.0 | 0.0 |
| 0.0 | 91.7 | 8.3 | 0.0 |
| 0.0 | 83.3 | 16.7 | 0.0 |
| 0.0 | 66.7 | 33.3 | 0.0 |
| 20.0 | 60.0 | 20.0 | 0.0 |
| 5.6 | 47.2 | 47.2 | 0.0 |
| 2.8 | 48.6 | 48.6 | 0.0 |
| 11.1 | 44.5 | 44.4 | 0.0 |
| 38.9 | 38.9 | 22.2 | 0.0 |
| 38.9 | 22.2 | 38.9 | 0.0 |
| 0.0 | 33.3 | 0.0 | 66.7 |
| 0.0 | 11.1 | 0.0 | 88.9 |
| 0.0 | 0.0 | 0.0 | 100.0 |
| 16.7 | 66.6 | 0.0 | 16.7 |
| 11.1 | 44.5 | 0.0 | 44.4 |
| 38.9 | 38.9 | 0.0 | 22.2 |
| 38.9 | 22.2 | 0.0 | 38.9 |

We have also used a wide variety of plastic clays. We have, for example, used the following combinations:

| | Ingredient | Per Cent |
|---|---|---|
| A | Plastic weathered fire clay | 10 |
|   | Flint | 40 |
|   | Kaolin | 40 |
|   | Resin | 10 |
| B | North Carolina kaolin | 10 |
|   | Georgia kaolin | 40 |
|   | Flint | 40 |
|   | Resin | 10 |
| C | Georgia kaolin | 50 |
|   | Flint | 40 |
|   | Resin | 10 |
| D | Surface clay | 10 |
|   | Kaolin | 40 |
|   | Flint | 40 |
|   | Resin | 10 |
| E | Bentonite | 1 |
|   | Kaolin | 44.5 |
|   | Flint | 44.5 |
|   | Resin | 10 |

We have also prepared bodies by slip-casting containing no clays whatever, although we ordinarily prefer to have some plastic clay present. One example of a nonclay body was: Flint 90 per cent and resin 10 per cent. For preparation of the slip water was added to the extent of 50 per cent of the weight of flint plus resin, and an alumina gel to the extent of 1 per cent.

Ceramic bodies prepared by this invention possess excellent physical properties. For example, a body consisting of 40 per cent each of flint and kaolin, and 10 per cent each of ball clay and feldspar when dried and heated to 300° F. had a modulus of rupture of 375 pounds per square inch. A similar body made under like conditions except that the feldspar was replaced with a like percentage of a thermosetting resin had a value of 2020 pounds per square inch, and one with the feldspar replaced by a like percentage of a thermoplastic resin had a value of 2000 pounds per square inch. The cold-crushing strength of the three bodies was 300, 4400 and 2590 pounds per square inch, respectively. Impact resistance was also improved. Similar test bodies were made and the height of drop of a 33-gram weight required to effect failure or shattering was determined. The body with no resin, corresponding to an unburned prior art body, when dried failed at a drop of 3 inches. The same body when burned to cone 10 failed at 15 inches. The body when prepared with 10 per cent of a thermosetting resin to replace the 10 percent of feldspar and baked at 400° F. failed at 21 inches and when made with a like percentage of a thermoplastic resin failed at 13 inches.

In one of the foregoing examples a body made of 90 per cent of flint and 10 per cent of resin and added thereto alumina gel to the extent of 1 per cent of the weight of the flint plus resin was described. When baked at 350° F. the test body broke at a drop of 21 inches.

It is obvious, therefore, that bodies made by this process possess mechanical properties comparable to burned bodies of a similar material containing a feldspar flux.

The method of adding the resin may vary. It has been added as a dry powder and the body prepared by blunging, milling, pugging and the like. It has also been found that the resin can be dissolved in a suitable solvent or dispersed as an emulsion and added to the slip or body.

As a modification of our method the resins may be formed in place. When aldehydes are condensed with phenols, ketones, or similar substances the immediate products are water soluble. Formaldehyde reacts with urea in the presence of barium hydroxide to form water soluble dimethlol urea. The latter when mixed with water in a mildly alkaline solution, for example, a clay slip, and dried, partly polymerizes to a water resistant resin. Similarly when formaldehyde is condensed with phenol in the presence of alkali, phenol alcohols and so-called saliretins are formed.

This phase of our invention will be illustrated by a specific example. We took 54 cc. formalin, equivalent to 20 grams formaldehyde, 20 grams urea and 0.8 gram $Ba(OH)_2$. The mixture was held at 80° F. for 15 minutes. Carbon dioxide was then passed into the solution to neutralize the $Ba(OH)_2$ and to stop further polymerization. Slips containing dimethylol urea were prepared directly from the reaction solution. An example follows:

| Ingredient | Per cent |
|---|---|
| Ball clay | 10. |
| Kaolin | 40. |
| Flint | 40 to 45. |
| Dimethylol urea solution | 5 to 10 (contained dimethylol urea). |
| $H_2O$ (including $H_2O$ in dimethylol urea solution) | 25% of wt. of dry body. |
| Electrolytes | 0.3% of wt. of dry body. |

Articles were slip-cast, dried, and baked in the usual manner.

A water soluble phenol formaldehyde product was made as follows: A mass of 100 grams 40 per cent formaldehyde, 100 grams phenol and 2.5 grams KOH was boiled 30 to 40 minutes, diluted with 75 cc. cold water, and cooled to room temperature. The product was a syrupy, viscous liquid miscible with water. A slip was made as follows:

| Ingredient | Per cent |
| --- | --- |
| Ball clay | 10. |
| Kaolin | 40. |
| Flint | 40 to 45. |
| Above-described resin syrup | 5 to 10. |
| Water (that in resin syrup excluded) | 22.5% of wt. of dry body. |
| Electrolytes | 0.25% of wt. of dry body. |

Articles were cast, dried, and baked in the usual manner.

While dried but unbaked bars made from slips made from water soluble urea-formaldehyde and phenol-formaldehyde resin constituents were appreciably more resistant to slaking in water than similar bars containing no resin, the resistance was not so good as after baking.

Broadly, then, this modification of the process involves reacting resin-forming ingredients to form water soluble products, making a slip in the usual manner employing said water soluble products, and heating to effect polymerization and maturing of the resin. The products formed have properties similar to those wherein previously formed resins were employed.

Coloring ingredients, for example, color oxides, may be added to the mix and the resultant bodies possess colors depending on colorants added and their amount.

Baked articles may be buffed or otherwise treated to give a smooth or artistic surface. Waxes, paints, lacquers, and the like may also be applied to the surface by means well known to the art. We may also coat the surface with a resin slip in which the desired colorant is added. We may, in fact, add the resin slip containing a colorant to the body before baking and thus effect a material saving in the amount of colorant used because if this procedure is followed it is unnecessary to have colorant present in the entire body.

By this invention ceramic articles are cheaply made and the expensive step of burning is eliminated. Bodies of excellent physical and mechanical properties are obtained. It is also possible to get unusual color effects, because colorants can be added that are ordinarily destroyed in burning processes used in the prior art. It is also possible to decrease materially the time required to produce a body since the long step of burning is eliminated. It is also possible, for example, in jiggered, pressed, and hand-made ware to get marble and similar variegated effects by using mixtures of bodies to which different colorants have been added. It is also possible to make simply articles of intricate shape and design which are extremely difficult and in some cases impossible in the prior art where burning must be employed. It is obvious, therefore, that this invention is a decided improvement in the ceramic art.

Having thus described our invention, what we claim is:

1. A baked but unburned slip-cast ceramic product consisting essentially in its finished form of a major portion of ceramic material including plastic clay, and 5 to 20 per cent of a resin.

2. A baked but unburned ceramic product consisting essentially in its finished form of a major portion of ceramic material and from 1 to 20 per cent of a resin.

3. A baked but unburned ceramic product consisting essentially in its finished form of a major portion of ceramic material and from 5 to 10 per cent of a resin.

4. A baked but unburned colored ceramic product consisting essentially in its finished form of a major portion of ceramic material, from 1 to 20 per cent of a resin constituting a bond for said product, and a colorant of a type substantially altered at normal firing temperatures of ceramic products.

5. A baked but unburned ceramic product made from a stiff-mud body consisting essentially in its finished form of a major portion of ceramic material including plastic clay, and from 5 to 20 per cent of a resin.

6. A raw ceramic product consisting essentially of ceramic material including plastic clay and from 1 to 20 per cent of a resin, said resin being adapted to bond said ceramic material and protect it from slaking, after hardening.

JOHN D. SULLIVAN.
CHESTER R. AUSTIN.